United States Patent

Sagar et al.

[11] Patent Number: 5,900,978
[45] Date of Patent: May 4, 1999

[54] RETROREFLECTIVE MATERIALS

[75] Inventors: Brian Sagar; Robert Moule, both of Cheshire, United Kingdom

[73] Assignee: Reflective Technology Industries Limited, Manchester, United Kingdom

[21] Appl. No.: 08/648,042

[22] PCT Filed: Nov. 17, 1994

[86] PCT No.: PCT/GB94/02537

§ 371 Date: Jul. 19, 1996

§ 102(e) Date: Jul. 19, 1996

[87] PCT Pub. No.: WO95/14248

PCT Pub. Date: May 26, 1995

[30] Foreign Application Priority Data

Nov. 17, 1993 [GB] United Kingdom ............... 9323673
Nov. 17, 1993 [GB] United Kingdom ............... 9323713

[51] Int. Cl.$^6$ ........................................... G02B 5/128
[52] U.S. Cl. ................................. 359/536; 359/539
[58] Field of Search .................... 359/534–539; 156/236, 247, 277, 325–328, 333–334; 428/320.2, 321.1, 321.3, 411.1, 914

[56] References Cited

U.S. PATENT DOCUMENTS 3,251,704  5/1966  Nellessen .
5,269,840  12/1993  Morris et al. ..................... 106/437
5,358,750  10/1994  Brookfield .

FOREIGN PATENT DOCUMENTS 0039734  6/1985  European Pat. Off. .
0305074  7/1993  European Pat. Off. .

Primary Examiner—James Phan
Attorney, Agent, or Firm—Charles E. Baxley, Esq.

[57] ABSTRACT

A material such as fabric, plastic, leather or paper incorporates retroreflective properties which result from the application of metal coated microbeads. Methods for the application of microbeads to various surfaces as well as the formulation of printing inks containing microheads are disclosed.

8 Claims, 3 Drawing Sheets

RETROREFLECTIVE MATERIALS

This invention relates to retroreflective materials, to making the same and to making material retroreflective, which is to say, given a material, making it retroreflective.

The principles underlying retroreflective materials are well known—glass microspheres, silvered hemispherically, are applied to the surface of the material after some fashion. The microspheres, if the incident light is on the unsilvered half, tend to totally internally reflect the light off the silvered part and direct it back towards its source. If the microspheres are orientated randomly, about a third of them will retroreflect at least to some extent.

The microspheres are silvered while embedded in an adhesive layer, which exposes only one hemisphere for silvering. The hemispherically silvered microspheres can be removed from the adhesive layer, by one means or another, as individual microspheres which can then be applied to an adhesive surface on a material which is to be made retroreflective. Measures have been proposed, as by applying a magnetic coating with the silvering and subjecting the individual particles to magnetic alignment whilst being applied to the material, to improve upon the proportion of correctly aligned microspheres over and above what is achieved by the laws of chance.

According to U.S. Pat. No. 3,989,775 microspheres are fully silvered and applied to a surface leaving half of each microsphere exposed, which is then desilvered. The microspheres are applied to the surface of rigid and flexible plastics materials which are embossed to improve the retroreflective properties for light incident at a large angle to the perpendicular to the plane of the surface of the material. Flexible polyvinyl chloride is said to be a most preferred material since it is not only easily embossed in continuous manner but it may be plasticised with, for example, dioctyl phthalate and other well known plasticisers to give a material having drape properties that make it suitable for use in the manufacture of garments.

In JP 60-175004, an inexpensive retroreflector is produced by providing a transparent thermoplastic resin layer on a metallic film, glass microspheres are deposited in a layer thereon and pressed in to deform the metallic layer. A similar process using a thin reflective layer and microparticles is disclosed in WO 91/06880.

For providing retroreflection to clothing, especially outdoor and particularly protective clothing for night safety, strips of retroreflective tape are commercially available to be sewn or glued on to the material of the clothing. There is currently, however, no commercially viable method generally applicable to the coating of any desired fabric or other material surface with properly aligned microspheres to make it efficiently retroreflective. WO 88/07214, which uses magnetic or electrostatic orientation of magnetic or electric dipole particles only promises that 30% of the particles are correctly aligned, which is no more, or scarcely more, than would be expected by randomly scattering them.

The present invention provides a method by which hemispherically silvered microspheres can be applied to a surface of any desired material in correct orientation for maximum retroreflectivity.

The invention comprises a method for making a material retroreflective comprising the steps of:

applying a layer of beads to a temporary adhesive layer on a surface so that a part of each bead is exposed and a part embedded in the adhesive layer;

coating the exposed parts of the beads; and transferring the beads from said temporary adhesive layer to a permanent adhesive on the surface of the material; characterised in that the beads are transferred while still attached to the temporary adhesive layer and freed therefrom when attached to the permanent adhesive so that the coated parts of the beads are enclosed in the permanent adhesive.

The layer of beads may be applied to a temporary adhesive layer on a flexible substrate, such as a plastic film. A suitable such film for many applications is a clear adhesive tape such as that sold under the Registered Trade Mark "Sellotape".

The layer of beads may be applied by passing the substrate through a fluidised bed of the beads. The fluidised bed may be heated, which may have the effect of softening or making more tacky the adhesive layer—a polyethylene surface, normally not adhesive, may be softened by the heat so as to pick up the beads.

A problem experienced with conventional fluidised bed roller transport means when used with glass microspheres is that the microspheres penetrate into the bearings. This problem is avoided according to what is seen as an independent invention by passing the substrate through the bed on roller means supported on bearings located above the level of the bed.

The temporary adhesive layer may be in a pattern or design so that the beads are transferred in said pattern or design. A pattern or design may be applied in the form of a coloured lacquer or pigment applied to selected areas of the layer of beads.

The exposed parts of the beads may be coated with a metallising layer as by vacuum deposition. Such an operation is commonly referred to as "silvering", though the metal used is not necessarily silver. The beads may also be coated with a transparent layer having a refractive index which is different from that of the beads. This can be selected to give substantially the same reflective properties whether the exposed surface is wet or dry. A coloured layer may also be applied.

The material to which the retroreflective coating is applied may comprise a textile fabric, for example a woven or knitted fabric, such as a woven or knitted fabric of the kind clothing is made of. Leather or other animal skins, plastic sheet material and paper are examples of other materials that may be made retroreflective. The permanent adhesive on the surface of the material may be in a pattern or design so that beads from a "solid" layer on the temporary adhesive layer are transferred only in said pattern or design.

The invention also comprises a material having a layer of part-coated beads attached with the coatings substantially completely aligned and in an adhesive layer on the surface of the material. The coating may comprise a retroreflective coating. The beads may be in a pattern or design on the surface of the material.

The material may comprise a textile or other garment material, and may be fabricated as a garment or garment component such as a sleeve or a back or a front panel.

It is also known to make retroreflective inks for printing or painting on to surfaces by incorporating retroreflective hemispherically coated beads or microspheres into the inks.

The beads or microspheres are hemispherically coated with a reflective metal layer and possibly other layers of lacquer which may be coloured and which may give improved retroreflective properties by having a refractive index different from that of the glass of which the beads are made.

The coating (at least of the metal) is applied as by vacuum deposition while the beads are supported partially embedded in an adhesive surface. The hemispherically coated beads must then be removed from the adhesive surface. The removal and subsequent storage of the beads presents certain problems in conventional approaches, not least in achieving and maintaining through storage adequate separation of the beads and the prevention of the formation of rafts or clumps of beads.

The present invention provides methods for the preparation of retroreflective inks that avoid such problems.

The invention comprises a method for making retroreflective inks containing retroreflective beads or microspheres for application to surfaces as a retroreflective layer comprising attaching the beads to an adhesive surface so that each bead is partially embedded and partially exposed, coating the exposed surface and separating the beads from the surface into a liquid carrier into which a further constituent or constituents may be added to make an ink.

The adhesive surface may be an adhesive surface of a plastics material tape such as Sellotape (RTM) which has a styrene/butadiene adhesive. The beads may be separated from the adhesive surface by a solvent for the adhesive or by ultrasonic vibration.

The beads may be attached to the adhesive surface in a fluidised bed of the beads. The adhesive surface may be carried on a roller through the bed which roller is supported on bearing means clear of the bed.

The beads may be metal-coated by vacuum deposition or otherwise. A clear coating may be applied to the beads having a refractive index different from that of the bead material, and a coloured coating may be applied either as a coloured lacquer or a pigment. Such clear and coloured coatings may be applied before or after metallisation and may be applied to the whole bead rather than hemispherically.

A further constituent added to the liquid carrier may comprise a pigment or a binder; such may be added to the liquid carrier before or after the beads.

The invention also comprises an ink or ink base made by a method according to the invention; the ink may be a heat transfer printing ink or a screen printing ink.

Embodiments of retroreflective materials and garments made from them and methods for making the materials retroreflective will now be described with reference to the accompanying drawings, in which.

Figure 1:
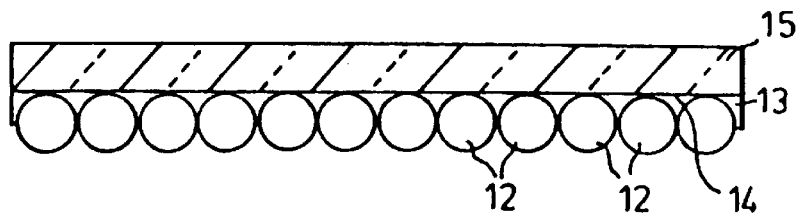
FIGS. 1, 2, 3 and 4 are a series of diagrams showing stages in one method.
Figure 2:
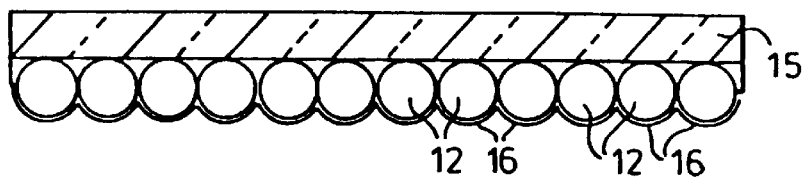
Figure 3:
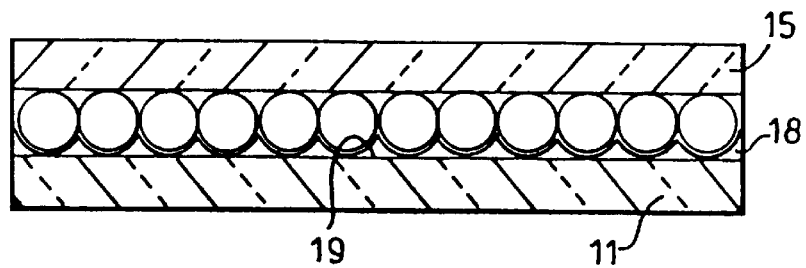
Figure 4:
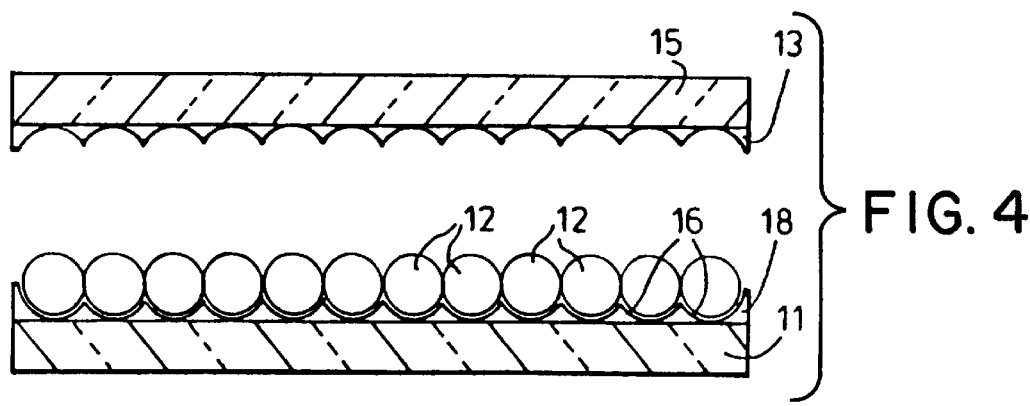

FIGS. 1 to 6 of the drawings illustrate methods for making a material 11 retroreflective.

As seen in FIGS. 1–4, a layer of beads or microspheres 12 is applied to a temporarily adhesive layer 13 on a surface 14 of a substrate 15. Glass microspheres of the kind referred to in the prior art documents mentioned above are equally useful in connection with the present invention.

Figure 5:
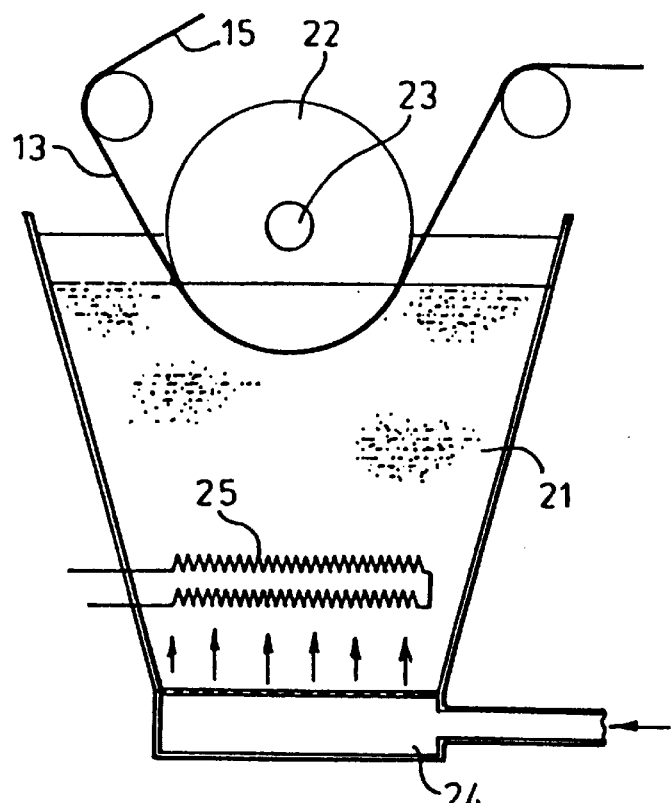
FIG. 5 is a sectional side elevation of a fluidised bed arrangement which may be used in the method illustrated in FIGS. 1–4.

The substrate 15 can be a flexible substrate such as a plastic film and an adhesive film such as Sellotape (RTM) can be used, or a paper, such as a kraft paper coated with an adhesive. The adhesive may be such that it becomes tacky, or more tacky, on heating. As with other processes involving the application of microspheres to surfaces, the beads may be simply scattered on to the adhesive surface, but a particularly effective method of application is in a fluidised bed 21 as illustrated in FIG. 5 in which the substrate 15, adhesive layer 13 down, is passed through the bed 21 on the surface of a roller 22 which is supported on bearings 23 clear of the surface of the bed 21 to avoid the microspheres of the bed 21 contaminating the bearings 23.

The bed 21 is heated by an electric resistance element 25. Air is supplied via plenum 24.

Figure 7:
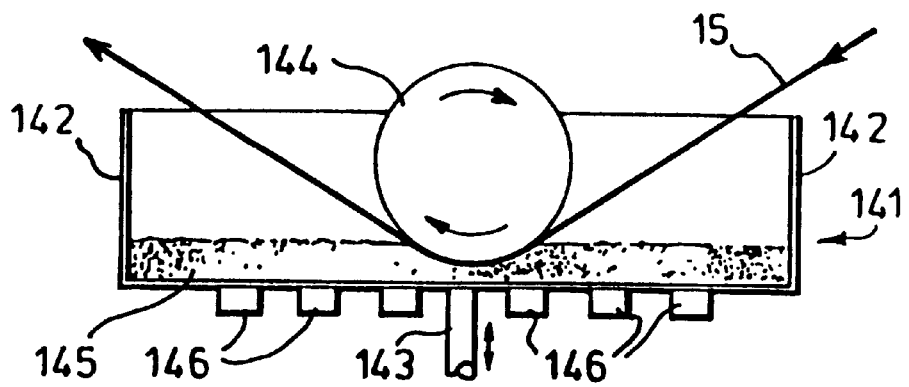
FIG. 7 is a side elevation of another fluidised bed applying beads to an adhesive tape, and coating the beads.

FIG. 7 illustrates another form of fluidised bed arrangement 141 which may be novel per se but in any event has been found to be very effective for the purpose of applying microbeads to a substrate.

The arrangement 141 comprises simply a tray with side walls 142 sufficiently high to prevent beads escaping. The tray is mechanically vibrated as by a central mounting column 143 which itself is subject to mechanical vibration or by an electromagnetic arrangement. A frequency of the order of 20 Hz is suitable.

A roller 144 dips into the fluidised layer of microbeads 145 and the substrate 15 is guided over it through the microbeads 145. The bed is heated as by heating coils 146 fixed to the underside of the tray.

Figure 8:
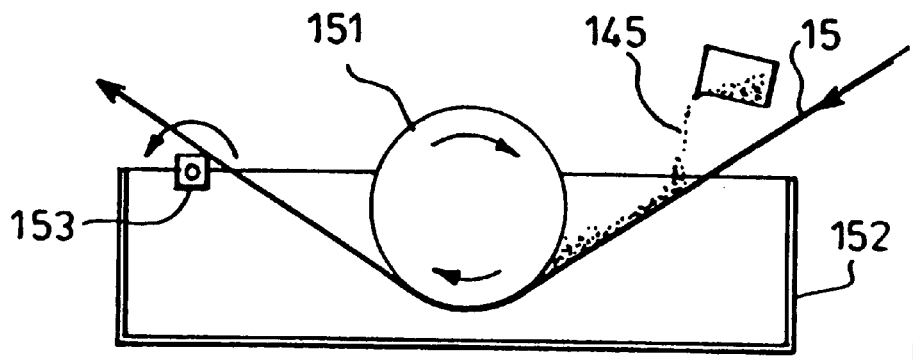
FIG. 8 is a side elevation of another arrangement applying beads to a substrate.
Figure 9:
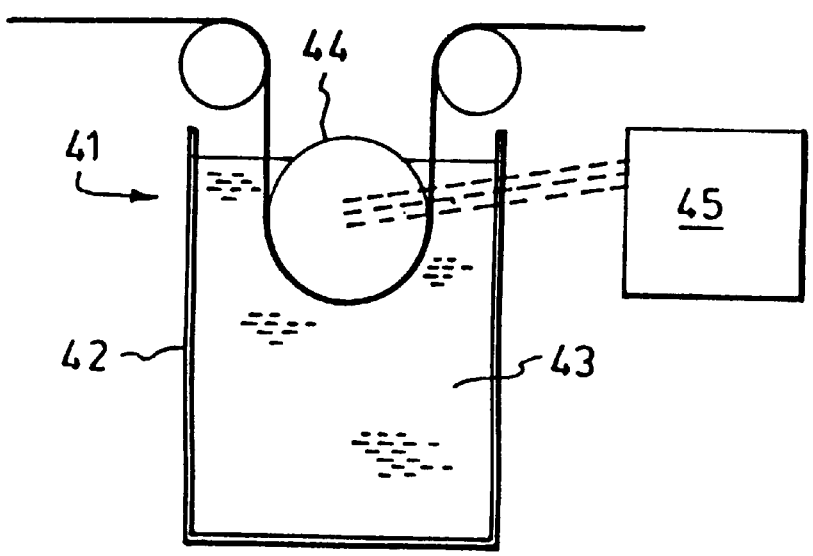
FIG. 9 is a side elevation of an arrangement separating the beads from the tapes shown in FIGS. 1–4, 7 and 8.

In another arrangement, illustrated in FIG. 8, a roller 151 is arranged in a tray 152 and the substrate 15 run beneath the roller 151 and over a vibrating rod 153 which may simply be a rapidly rotating square section rod. Microbeads 145 are poured onto the substrate 15 (which is adhesive side up) so as to collect in the cusp formed between the substrate 15 and the roller 151.

The temporarily adhesive layer 13 on the substrate 15 can be in a pattern or design—such as a stripe or chequer design, or in the form of letters or words or numerals. Or the beads may be printed (as by ink jet printing) with a pattern or design in a coloured lacquer or with a pigment—such a pattern or design may later be picked out when the finished material is appropriately illuminated and viewed.

The substrate 15 will not pick up the beads where there is no adhesive, and the beads will eventually be transferred in the said pattern or design.

For maximum retroreflection, the beads on the substrate 15 are coated with a metallising layer 16 in the usual way, by vacuum coating, or by some equivalent technique. The beads can also be coated with a transparent layer having a refractive index different from that of the glass material of the beads and possibly with a colour. Such coatings may be applied in an earlier operation so as to cover the entire surface of each of the beads.

The beads 12, part coated, are transferred from the said temporarily adhesive layer 13 to a permanently adhesive layer 18 on the surface of the material 11 that is to be made retroreflective. This is essentially effected by placing the substrate 15 bead-face down on the surface 19 of the material 11, while that surface 19 is coated with said permanently adhesive layer 18.

By "permanent" in this connection is meant that the beads 12 are not intended to be removed from the layer 18 and that such layer 18 is not intended to be removed from the surface 19 of the material 11. It is not to be expected, of course, that the beads will never separate from the surface 19 when the material 11 is subject to normal wear and tear, laundering, dry cleaning and the like, and "permanent" must be read therefore in relation to the expected useful life of the material 11.

The material 11, clearly, can comprise any one of many materials, but, in particular, textile materials can be used and these may be fabricated as a garment or a garment component or components. Thus, for example, a jacket may have its front and back panels and/or its sleeves made of such fabric.

Figure 6:
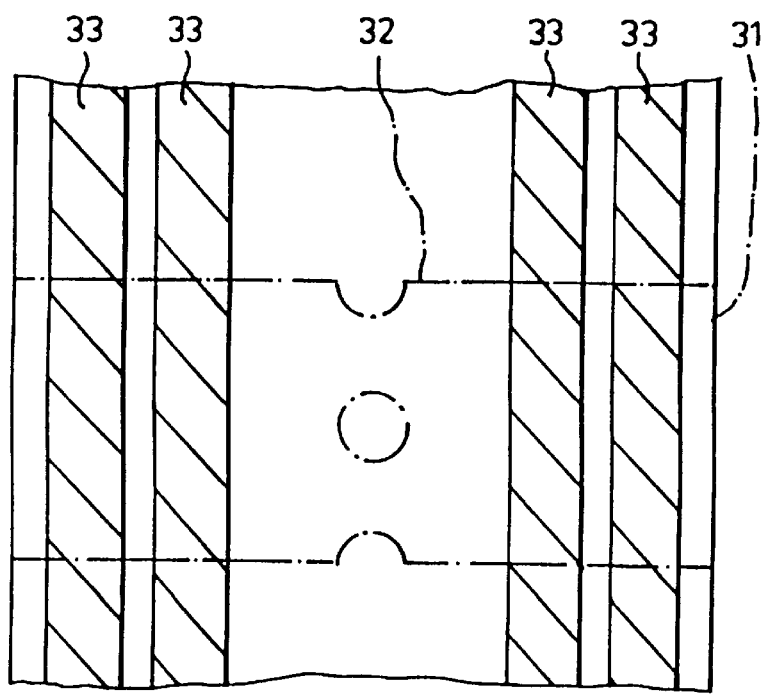
FIG. 6 is a view of a retroreflective stripe fabric with an outline of a tabard to be cut from it.

FIG. 6 illustrates a method for making a tabard 31 from a width of fabric 11 simply by cutting on the outline 32. The fabric has had applied to it retroreflective stripes 33 as described above. The stripes 33 or other pattern or design might be applied from a "solid" layer of beads 12 on the substrate 15 by selectively applying permanent adhesive to the material 11 so that the beads are transferred only in the adhesive areas.

Patterned effects can also be produced by using a heated embossed roller to transfer the beads from the tape to which they are attached using a heat activatable adhesive. A pin-stripe or microdot effect can be achieved in this way to impart whole-body retroreflectivity in garments.

It may not be necessary to apply the permanent adhesive to the material 11—it may instead be applied to the coated beads 12 while on the substrate 15. A transfer treatment akin to heat transfer printing can be used to print the beads 12 on to the fabric 11 without any preparation of the fabric 11, the heat serving to release the beads 12 from the substrate 15 and also to render tacky the permanent adhesive coating their material 11-oriented side.

The resulting material is a new product inasmuch as although processes have been proposed for applying beads or microspheres to any desired material (rather than to specially constructed laminate) such processes have been unable to provide for substantially complete alignment of the hemispherically coated microspheres or beads for the most effective retroreflection properties. The techniques taught herein are clearly suitable for applying a correctly aligned layer of beads to textile fabrics, to plastics films r sheets and indeed to the surfaces of said objects such as road traffic signs and markers, automobile bumpers and cyclists' and pedestrians' clothing and accessories.

FIGS. 6 and 7 to 9 of the drawings illustrate a method for making retroreflective inks containing retroreflective beads or microspheres for application to surfaces as a retroreflective layer.

The method comprises attaching the beads, as before, to an adhesive surface 13 of a tape 15 such as Sellotape (RTM) so that each bead is partially embedded and partially exposed. The attachment is effected in a fluidised bed arrangement as described above with reference to FIG. 5 or FIG. 7 or in an arrangement such as described with reference to FIG. 8.

The tape 15 can be passed directly, or after being wound up and stored, into vacuum deposition equipment which coats the exposed parts of the beads with metal.

The tape 15 can be wound up at this point and stored or passed straight to a bead separation arrangement 41 as shown in FIG. 6 which comprises a vessel 42 containing a liquid carrier 43 for the ink and a roller 44 which is connected to an ultrasonic vibrator 45—or the ultrasonic vibrator 45 is connected to a plate in the liquid carrier 43—which shakes the beads off the tape 15 and into the carrier 43.

The tape 15 is wound up to waste or reuse.

Pigment, binder and/or other ink constituents are added to the carrier 43 either before or after the beads.

The beads may also be washed off using a solvent for the adhesive instead of or in addition to the ultrasonic vibration, or by immersing them for about 5 minutes in aqueous solution of a weak acid, preferably having a pK value between 1.9 and 3.1, such as maleic acid, citric acid or phosphoric acid.

The microbeads are recovered as a wet slurry from the tape which is incorporated directly into a suitable aqueous binder system, for example containing an acrylic binder system containing reactive groups along the polymer chain, a melamine formaldehyde self-crosslinking system, suitable thickener, dispersant, softener, biocide and other customary ink additives.

It is found to be preferable to restrict the metal coating on the microbeads to the thickness of 350 Å for improved shelf-life.

The inks may be used for rendering any printable surface retroreflective and may in particular be used as intaglio inks for printing security or anti-counterfeiting labels. Attractive iridescent effects can be produced using appropriate printing techniques.

Washfastness of the retroreflective effect on a printed textile can be improved by pretreating the hemispherically coated beads in the recovered slurry with an aqueous mixture containing reactive silane monomer and/or polysiloxane; these or similarly reactive materials could also, or alternatively, be incorporated into the formulated printing ink.

Improved washfastness can also be achieved by treating the fabric after printing with an aqueous dispersion containing a conventional cross-linking agent such as dihydroxydimethylol cyclic ethylene urea (Fixapret TX 244), a catalyst (eg magnesium chloride) and a perfluorocarbon component such as Teflon HT.

To produce garments with whole body retroreflectivity, fabrics can be printed with an overall coating of hemispherically-metal coated glass microbeads bound to the fabric with a suitable binder system. By "overall coating" is meant not only a solid coating but also a patterned coating such as a striped pattern, as may be effected using screen printing techniques.

A screen printed pattern of microdots (eg about 3 mm diameter) can improve drape and washfastness as well as wet abrasion resistance.

Retroreflection in colour can be achieved by incorporating a suitable pigment into the printing ink. A bronze or silver appearance can be achieved by incorporating metal eg aluminium flake in the ink.

To avoid any greying effect on white or pale shades or on high daylight conspicuity fabrics, the metal coating on the retroreflective beads can be coated with a lacquer containing a suitable dye or pigment such as white or harvest yellow.

We claim:

1. A method for making retroreflective inks containing retroreflective beads or microspheres for application to surfaces as a retroreflective layer, comprising attaching the beads to an adhesive surface so that each bead is partially embedded and partially exposed, coating the exposed surface and separating the beads from the surface into a liquid carrier, in which a clear coating is applied to the beads having a refractive index different from that of the bead material.

2. A method according to claim 1, in which the said coating is applied over the entire bead.

3. A method according to claim 1, in which said coating is applied hemispherically.

4. A method according to claim 1, in which a pigment is added to the liquid carrier.

5. A method according to claim 1, in which a binder is added to the liquid carrier.

6. A method for making retroflective inks containing retroreflective beads or microspheres for application to surfaces as a retroreflective layer, comprising attaching the beads to an adhesive surface so that each bead is partially embedded and partially exposed, coating the exposed surface and separating the beads from the surface into a liquid carrier, in which a colored coating is applied to the beads.

7. A method according to claim 6, said colored coating containing a pigment.

8. A fabric printed with a retroreflective ink containing microbeads then treated with an aqueous dispersion containing a cross-link agent, a catalyst and a perfluorocarbon component.

* * * * *